V. T. HOUGHTON.
WINDOW CLEANING ATTACHMENT FOR AUTOMOBILE WIND SHIELDS AND THE LIKE.
APPLICATION FILED MAY 15, 1913.

1,075,915.

Patented Oct. 14, 1913.

WITNESSES:

INVENTOR
Vernon T. Houghton.
BY
ATTORNEYS.

UNITED STATES PATENT OFFICE.

VERNON T. HOUGHTON, OF WASHINGTON, DISTRICT OF COLUMBIA.

WINDOW-CLEANING ATTACHMENT FOR AUTOMOBILE WIND-SHIELDS AND THE LIKE.

1,075,915.  Specification of Letters Patent.  Patented Oct. 14, 1913.

Application filed May 15, 1913. Serial No. 767,854.

*To all whom it may concern:*

Be it known that I, VERNON T. HOUGHTON, a citizen of the United States, and resident of Washington, in the District of Columbia, have invented certain new and useful Improvements in Window-Cleaning Attachments for Automobile Wind-Shields and the like; and I do hereby declare the following to be a full, clear, and exact description of the invention, such as will enable others skilled in the art to which it appertains to make and use the same.

The present invention relates to window cleaning devices and has special reference to that type which is intended to clean water, frost and the like from the window.

The object of the invention is to provide such a device which will be continuous in its action, thereby making the invention especially applicable to wind-shields of automobiles, vestibule windows of street cars and the like, where an accumulation of water or frost is most objectionable.

A further object of the invention is to construct the parts in a novel manner, so that it may be sold as an attachment and readily applied to any automobile wind-shield.

Other objects are to provide an adjustable support for the window cleaning element, so that the latter may be held in contact with that portion of the window which it is desired to clean, the support being capable of a swinging movement to render the attachment movable to an inoperative position.

The invention further contemplates the provision of a rotary wiping or window cleaning element adapted to be supported in contact with the window and rotated at sufficient speed, so that the rotation of the element will not interfere with clear vision through the window.

Broadly, the invention consists in supporting a rotary squeegee in contact with any portion of the glass and providing means to rotate the squeegee so as to render the same automatic and continuous in its operation.

The invention is illustrated in the accompanying drawings, in which the improved device is shown in combination with an automobile wind-shield, but as will hereinafter appear, it is capable of other applications.

Figure 1:
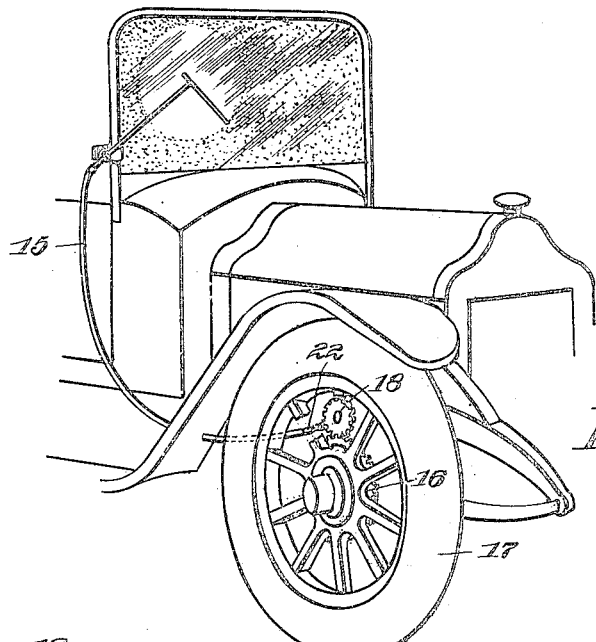
Figure 3:
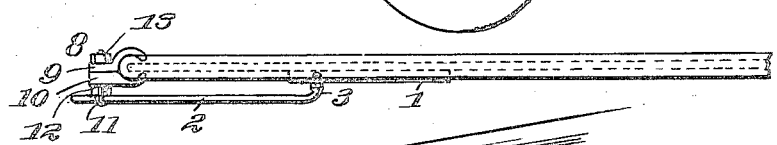
Figure 2:
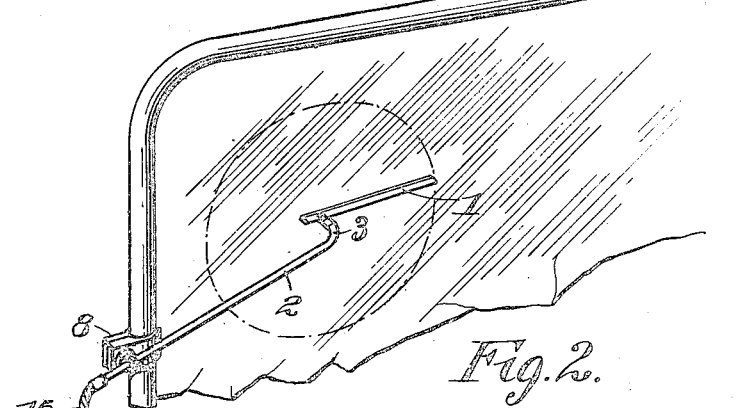
Figure 5:
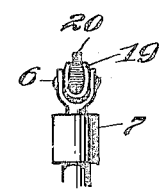
Figure 4:

In the drawings:—Figure 1 is a perspective broken view of an automobile showing the attachment applied to the wind-shield and the manner of operating the same; Fig. 2 is an enlarged broken view of the wind-shield and the improved attachment; Fig. 3 is a top plan view of the construction shown in Fig. 2; Fig. 4 is an enlarged view, partly in section, of the rotary squeegee; and Fig. 5 is an end view of the construction shown in Fig. 4.

Referring to the drawing, the numeral 1 designates the rotary squeegee which is preferably supported in contact with the glass by means of a hollow tube 2, the extremity of which is preferably bent toward the glass, as at 3. The squeegee is rotatably mounted in the extremity of the tube 2 in any suitable manner, such as by providing a bearing 4 carrying a bifurcated part 5 in which the squeegee 1 is pivotally mounted, as at 6, permitting the squeegee to accommodate itself to the plane of the glass. The bearing 4 may be positioned by a bearing cap 7 screwed on the extremity of the tube 2.

The above described method of mounting the squeegee is merely for the sake of example, as obviously, it may be mounted in numerous ways to produce the desired result.

When the attachment is applied to an automobile, a clamp denoted generally by reference character 8, is preferably employed having the clamping members 9 and 10 and an eye-bolt 11 adapted to clamp the tube 2 against the washer 12 when the nut 13 is tightened. Obviously, any suitable clamp may be employed.

The squeegee is preferably rotated by means of a flexible cable 14, (Fig. 4,) which is secured to the bearing 4, and runs through the hollow tube 2, down through a suitable flexible casing 15 to the front axle of the automobile, where it is driven in a manner similar to that employed for driving speedometers, namely, by a gear 16 mounted on the wheel 17 of the automobile, and meshing with a pinion 18 mounted on the actuating rod of the wheel 17. The casing 15, drive 14 and gearing 16, 18 may be of the same construction, as is used for automobile speedometers.

In case the automobile to which the present attachment is to be applied is supplied with the speedometer gearing 16—18, it is only necessary to supply an additional pinion meshing with either gear 16 or pinion 18, and drive the flexible cable 14 from said additional pinion. The squeegee may be rotated in other ways, but the one described has the advantage that the driving cable is all concealed. When used on a car vestibule-window, the squeegee may be rotated in any suitable manner.

The squeegee itself, shown in detail in Fig. 4, may be conveniently and cheaply made by bending a strip of sheet metal 19 into clamping engagement with a piece of rubber or other material 20, as best shown in Fig. 5. The squeegee may be mounted intermediate its ends in the bifurcated bracket 5, or it may be mounted near one of its ends, as shown in Fig. 4. In the latter case, it is preferable to provide a suitable counter weight 21 to balance the opposite arm of the squeegee.

In order to throw the squeegee into and out of operation, any suitable means may be employed. A clutch 22 may be used for this purpose similar to that used on motorcycle speedometer drives and which are operable by merely pushing or pulling the flexible casing adjacent the clutch. Obviously, the clutch may be located anywhere in the length of the drive.

From the foregoing, it is obvious that the tube 2 may be adjusted by loosening the nut 13, so that said tube may be made to assume any angular position over the glass. It can also be moved longitudinally in the eye bolt 11, and these two movements permit the squeegee to be so adjusted that the windshield is cleaned in the proper place relative to the operator's location in the automobile. When the nut 13 is tightened, the tube 2 is effectively held in position, and the squeegee pressed against the glass, so that the rubber or other material 20 rotating in contact with the glass, will efficiently clean the same.

The size of the driving gears is preferably so chosen that the squeegee makes sufficient number of revolutions to render the same practically invisible. It has been proven in practice that the squeegee cannot be seen when rotated sufficiently fast and the operator is not aware of its presence in front of him. This is not essential, however, as it may sometimes be desirable to rotate the squeegee slowly. A circular area depending upon the length of the squeegee is therefore constantly kept clean on the wind-shield without any manipulation or attention on the part of the automobile driver, such as has been necessary with previous manually operable window cleaning devices.

When the attachment is not in use, the tube 2 may be swung to a perpendicular position, where the squeegee and tube will remain in alinement and close to the side of the wind-shield. If so desired, the attachment can be entirely removed when not in use.

The construction of the few parts of the improved device is so simple that the invention is in the nature of an attachment which may be quickly and cheaply applied to any wind-shield without in any way injuring the same, such as has previously been the case, where a window cleaning element has been journaled right in the glass.

When applied to a car window or used in a similar relation, the tube 2 may be pivotally mounted in any suitable manner to support the squeegee in contact with the glass, and any convenient driving means employed.

What I claim is:—

1. A device of the kind described, comprising a rotary window cleaning element, means projecting over the glass of the window to support said element in rotative contact with the glass, means to secure said first-named means in fixed position, and power operated means to continuously rotate said element.

2. A device of the kind described, comprising a hollow support adapted to project over the glass of a window, a window cleaning element associated with said support, means to secure said support in fixed position, and means in said support and operatively connected to said element to actuate the same.

3. A device of the kind described, comprising a rotary window cleaning element, a support in which said element is journaled, and means to secure said support in fixed relation to the window, said support being adjustable angularly and longitudinally in said means to permit said element to clean any desired portion of the window.

4. A device of the kind described, comprising a rotary window cleaning element, a hollow tube in which said element is journaled, means to secure said tube in fixed relation to the window so that said element may be rotated in contact with the glass of the window, and flexible driving means passing through said tube and operatively connected to said rotary element.

5. A device of the kind described, comprising a rotary window cleaning element, a support adapted to project over the glass of the window and in which said element is journaled, and means to secure said support in fixed relation to the window, said means being operable to permit said support to be swung back and forth over the window for the purpose described.

6. In a window cleaning device, a wiping element, means for securing the same in juxtaposition with the portion of the window to be cleaned, and power operated mechanism for rotating the wiping element, so that the rotating of the element will not interfere with clear vision through the window.

7. A wind-shield cleaner for automobiles and the like comprising a support adapted to project over the glass of said wind-shield, a rotary window cleaning element rotatably journaled in said support, means to clamp said support in a fixed position to the frame of the wind-shield, and power operated means to rotate said window cleaning element.

8. A window cleaning device comprising a rotary squeegee, means to support the same in rotative contact with the window, and power operated means to rotate the same.

In testimony whereof I affix my signature, in presence of two witnesses.

VERNON T. HOUGHTON.

Witnesses:
   GERTRUDE M. STUCKER,
   G. BURROUGHS.